United States Patent [19]

Bucholtz et al.

[11] 4,049,208

[45] Sept. 20, 1977

[54] CHUCK SPINDLE POSITIONING MECHANISM FOR ARMATURE WINDING MACHINE

[75] Inventors: Glen E. Bucholtz; Hyman B. Finegold, both of Dayton, Ohio

[73] Assignee: The Globe Tool and Engineering Company, Dayton, Ohio

[21] Appl. No.: 732,541

[22] Filed: Oct. 14, 1976

[51] Int. Cl.² ............................................ H02K 15/04
[52] U.S. Cl. ............................................. 242/7.05 B
[58] Field of Search ................... 242/7.05 B, 7.05 A, 242/7.05 R, 68.4, 129.51; 269/25, 157, 256

[56] References Cited

U.S. PATENT DOCUMENTS

| 3,013,737 | 12/1961 | Moore | 242/7.05 X |
| 3,892,366 | 7/1975 | Ott | 242/7.05 B |
| 3,980,243 | 9/1976 | Schulman | 242/7.05 B |

*Primary Examiner*—Edward J. McCarthy
*Attorney, Agent, or Firm*—Dybvig & Dybvig

[57] ABSTRACT

A mechanism for positioning a spindle with a chuck mounted thereon comprises a cartridge supported for sliding axial movement, means journalling said spindle in said cartridge and restraining said spindle against axial movement relative to said cartridge, and class 1 lever means for axially positioning said cartridge and thereby also positioning said spindle and said chuck.

5 Claims, 4 Drawing Figures

CHUCK SPINDLE POSITIONING MECHANISM FOR ARMATURE WINDING MACHINE

BACKGROUND OF THE INVENTION

1. Field of the Invention

The present invention relates to chuck positioning mechanisms for armature winding machines.

2. Prior Art

A chuck positioning mechanism of a type commonly used in the prior art is illustrated and described in U.S. Pat. No. 3,013,737, issued to H. W. Moore. Such chuck positioning mechanism requires the use of relatively large levers which are engaged at one end of each to respective right and left-hand flier spindles through yoke connections, and a fluid actuator member for simultaneously moving the opposite end of each lever, thus to move the spindles and the chucks supported thereby. Such mechanism is relatively large and space consuming.

An object of the present invention is to provide a new and improved chuck positioning mechanism for use in armature winding machines.

Another object of the present invention is to provide a compactly assembled chuck positioning mechanism utilizing a cartridge which journals a spindle for supporting the chuck to be positioned and utilizing a first class lever for positioning said cartridge and thereby positioning the chuck member to be positioned.

Other objects and advantages will become apparent from the following description and the drawings.

SUMMARY OF THE INVENTION

In the present invention, a cartridge member is supported by the frame means for an armature winder. The cartridge journals a spindle which supports a chuck member. The spindle is restrained against axial movement relative to said cartridge. For positioning the spindle and thereby positioning a chuck member supported by said spindle, a first class lever pivoted to the frame means for the armature winding machine is engaged at one end to the cartridge and actuated at the other end of such lever by fluid actuator means. When used in connection with double flier winding machines, identically constructed and separately positionable cartridge members are utilized, one for each flier spindle.

DESCRIPTION OF THE PREFERRED EMBODIMENTS

Figure 1:
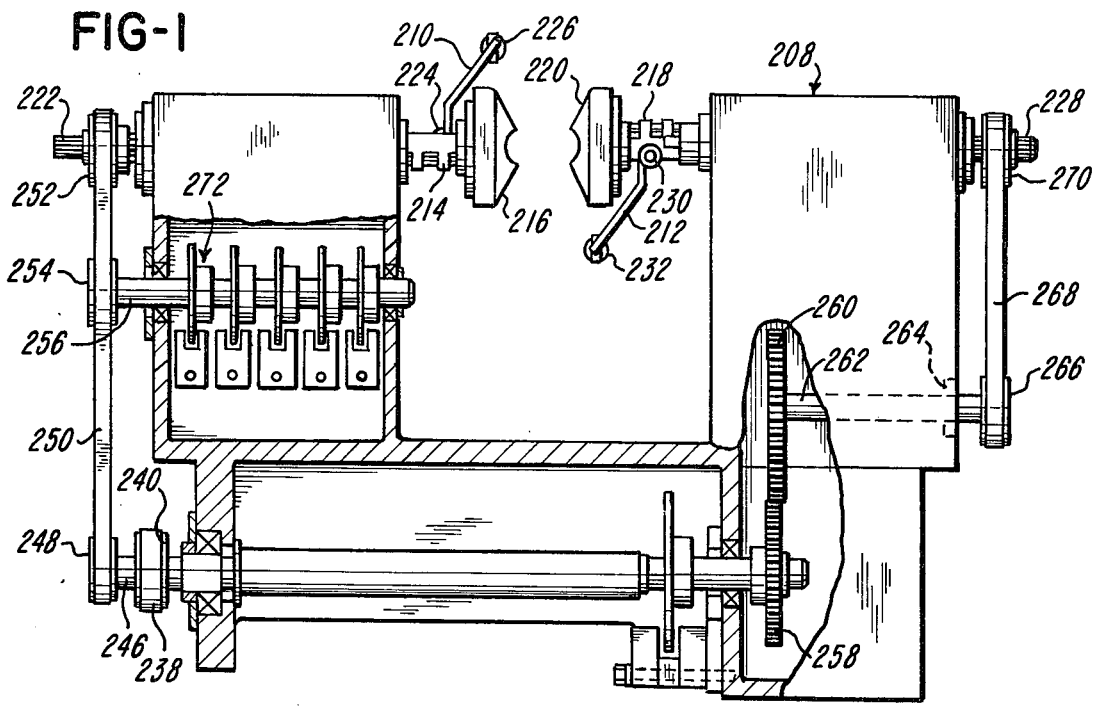
FIG. 1 is a front elevation view with portions broken away illustrating an armature winding machine of the double flier type.
Figure 2:
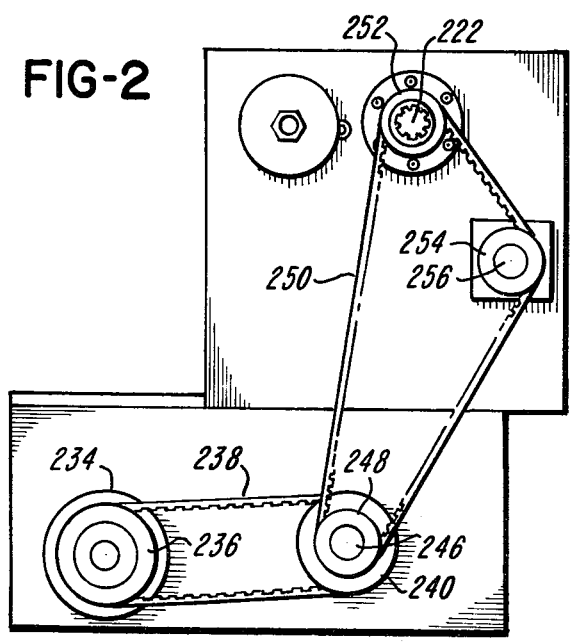
FIG. 2 is a side elevation view illustrating the left side of the armature winding machine of FIG. 1.
Figure 3:
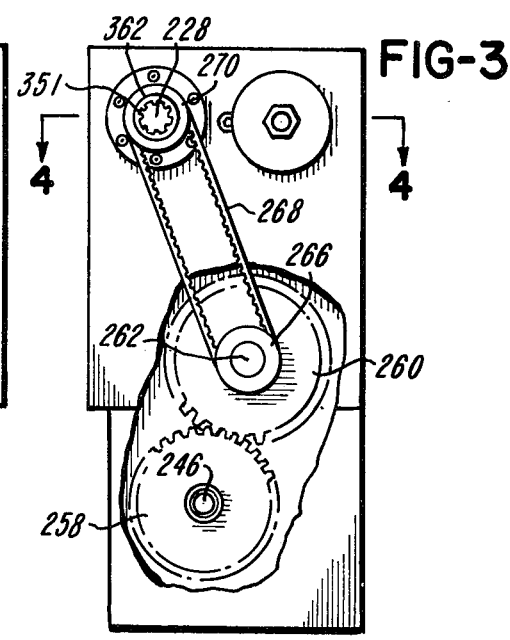
FIG. 3 is a side elevation view with a portion broken away illustrating the right side of the armature winding machine of FIG. 1.

Referring to the drawings, the spindle positioning mechanism of this invention is disclosed in reference to a double flier winding machine 208 illustrated in FIGS. 1, 2 and 3. The machine 208 has fliers 210 and 212 which are rotated, usually equally and oppositely, about an armature core, not shown. The armature core is to be supported between movable chucks 216 and 220. The chuck 216 is mounted for rotation relative to a hub 214, which supports the flier 210. Likewise, the chuck 220 is rotatably mounted with respect to a hub 218 supporting the flier 212. Wire to be wound by the flier 210 passes from a source of such wire, not shown, through a hollow spindle 222 fixedly attached to the hub 214, the wire progressing axially through the spindle 222 and the hub 214 to exit from the hub 214 through an opening surrounded by a sleeve 224. After the wire exits the hub 214 through the sleeve 224, the wire is passed over a pulley 226 to a position, not shown, where the wire can be attached to a portion of the armature core, not shown, which is to be wound.

In a similar fashion, wire being supplied to the flier 212 passes axially through a hollow shaft or spindle 228 to the hub 218, where the wire exits through a sleeve 230 and over a pulley 232 to a position, not shown, where the wire can be attached to the armature core, not shown.

Directly driven by a motor 234, which is preferably a direct current servo motor, is a pulley 236 engaged by a timing belt 238. The timing belt 238 is looped about a pulley 240 affixed to a cross shaft 246. Affixed to the cross shaft 246 is a pulley 248 drivingly engaged to a timing belt 250. The timing belt 250 drivingly engages a pulley 252 fixedly attached to the aforementioned hollow shaft 222. The timing belt 250 also drivingly engages a pulley 254 fixedly engaged to a shaft 256 for driving a timing mechanism 272, which is used to monitor the winding machine operation.

The right-hand flier spindle 228 is driven rotatably in unison with the cross shaft 246 by means of a gear 258 affixed to the cross shaft and reversably driving a gear 260 affixed to a shaft 262 suitably journalled in a bearing such as the bearing 264 and affixed to a pulley 266 drivingly engaged to a timing belt 268. The timing belt 268 drivingly engages a pulley 270 splined to the spindle 228 supporting the flier 212.

Figure 4:
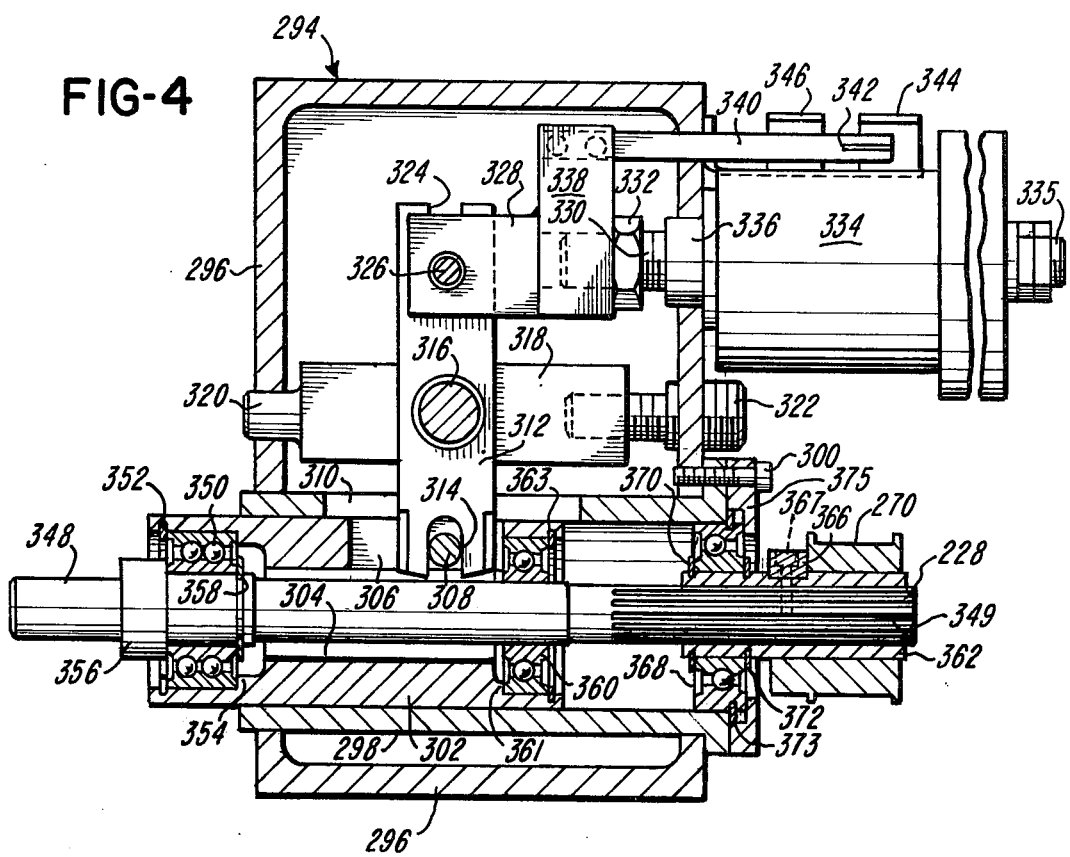
FIG. 4 is a section view taken substantially along the line 4—4 of FIG. 3.

To allow armature core movements, so as to present new slots for coil winding and for the purpose of opening the chucks 216 and 220 for the removal of completely wound armatures and the insertion of new armature cores for winding, the following mechanism illustrated in FIG. 4 is utilized for actuating the chucks 216 and 220 toward or away from each other to respectively grip or release an armature core.

FIG. 4 illustrates the chuck release mechanism for the right-hand chuck 220. The chuck release mechanism for the left-hand chuck 216, being identical as to operation to the chuck release mechanism of FIG. 4, is not particularly illustrated in this application.

The chuck release mechanism 294 includes a housing 296 traversed by a hollow, cylindrical member 298 affixed to the housing 296 by a bolt such as the bolt 300 illustrated in FIG. 4. Slidably mounted within the member 298 is a cartridge 302 having a concentric bore 304 and having an axially disposed slot 306 passing radially from the outer wall of cartridge 302 to the wall of the bore 304. The section of FIG. 4 having been taken through the center at the axial slot of cartridge 302, only one wall of the slot 306 appears in FIG. 4.

The axially disposed slot 306 is traversed by a pin 308. An axially disposed slot 310 in the member 298 is aligned with the slot 306 so as to permit the passage of a control member 312 through the slot 310 and the slot 306. The control member or lever 312 has a bifurcation 314 which straddles the pin 308 so as to have driving engagement with the pin 308.

The member 312 is pivoted as a class 1 lever about an axle 316 affixed to an adjustable support 318 having a stub shaft 320 exiting the housing 296 through a suitable opening and positioned in the housing 296 by means of a threaded position control member 322. Adjustment of the position control member 322 adjusts the distance of the axle 316 from the upright sides of the housing 296, which are sectioned in FIG. 4.

The control member 312 has a slot 324 formed at the upper end thereof as appears in FIG. 4 for sliding receipt of a shaft 326 journalled in a clevis member 328 which straddles the control member 312.

Clevis member 328 is threadedly engaged to a screw member 330 and, when positioned along the length of the screw member 330, is locked by means of a threaded nut 332. Screw member 330 is threadedly engaged in a hub 336 which is an integral part of a piston, not otherwise shown in detail, which is slidably moved within the cylinder of an actuator 334 by means of a fluid under pressure supplied to the actuator 334 through a fitting 335. The piston cooperates with the actuator to bidirectionally actuate the clevis 328 so as to move the shaft 326 horizontally within the housing 296. The member 312 transmits the movements of the shaft 326 to the cartridge 302 which moves axially within the member 298 in a horizontal direction opposite the direction in which the shaft 326 is moved.

Welded to the clevis 328 is an upstanding plate 338 to which is affixed a staff 340 which carries a proximity switch actuator 342. As the shaft 326 is moved horizontally in the housing 296, the staff 340 moves the actuator 342 horizontally with respect to proximity switches 344 and 346, which may be used in monitoring the operation of the winding machine.

FIG. 4 illustrates the right-hand chuck positioning mechanism at a time when the right-hand chuck supported on the left end of a shaft 348 is in an armature supporting position. The shaft 348 is accordingly advanced in the leftward direction as appears in FIG. 4 to nearly the limit of its leftward travel. For repositioning the shaft as, for example, to release an armature core being supported in the armature winding machine, the actuator 334 is energized to advance the clevis 328 to the left, thus causing control member 312 pivoting about the axle 316 to advance the cartridge 302 to the right as appears in FIG. 4. The shaft 348 is supported for rotation within the cartridge 302 by means of a bearing 350. The bearing 350 is retained against axial movement in the cartridge 302 by means of a snap ring 352 cooperating with a shoulder 354 formed integrally in the cartridge 302. The shaft 348 is retained against axial movement relative to the bearing 350, which serves as a thrust bearing, by means of an enlarged shoulder 356 on the shaft 348 cooperating with a snap ring 358 seated in an appropriate groove in the shaft 348. A bearing 360 supported within the cartridge 302 against an internal shoulder 361 is retained in position by a snap ring 363. The bearing 360 cooperates with the bearing 350 to support the shaft 348 concentrically within the cartridge 302.

The shaft 348 is an integral extension of the aforementioned shaft 228 received in pulley 270. Shaft 228 has peripherally spaced flutes 349, best seen in FIG. 4, which are slidably engaged with interfitting ribs 351, best seen in FIG. 3, which are formed in a sleeve bearing 362.

The sleeve bearing 362 is held against axial movement by means of a thrust bearing 368 retained in the member 298 between a snap ring 373 and a ring 375 secured by bolts such as the bolt 300. Snap rings 370 and 372 seated in suitably formed annular grooves in the sleeve bearing 362 hold the sleeve bearing 362 against axial movements with respect to the bearing 368.

The sleeve bearing 362 supports the previously described pulley 270, such pulley being nonrotatably secured to the sleeve bearing 362 by means of a key member 366 secured by a fastener 367 which passes tangentially alongside the shaft 228 and which does not enter the shaft 228.

As apparent in view of the foregoing description, the assembly illustrated in FIG. 4 permits axial adjustments of the chuck member 220 mounted to the shaft 348 without interfering with rotary movements transmitted to the pulley 270 by the timing belt 268.

Although the preferred embodiments of this invention have been described, it will be understood that various changes may be made within the scope of the appended claims.

We claim:

1. In a flier-type armature winding machine, mechanism for axially positioning a spindle rotatably driven through a spline connection and supporting a flier comprising, in combination, a cartridge receiving said spindle, thrust transmitting bearing means journalling and axially retaining said spindle within said cartridge, frame means supporting said cartridge for movement in a direction parallel to the rotational axis of said spindle, lever means pivoted to said frame means and engaged at one end to said cartridge, and actuator means for actuating said lever means to move said one end in a direction parallel to the rotational axis of said spindle.

2. In an armature winding machine of the type wherein a spindle supporting a flier is driven rotatably to wind wire around an armature core by a drive means having a spline connection to said spindle, said spindle mounting a chuck for supporting said armature core, the improvement comprising cartridge means supported by said machine for movement in a direction parallel to the rotational axis of said spindle, bearing means journalling said spindle to said cartridge means for transmitting motion from said cartridge means to said spindle, a force producing actuator, and lever means pivoted to said machine for transmitting a force from said actuator to said cartridge, said actuator operable through the medium of said lever to move said cartridge and therewith said spindle in a direction parallel to the rotational axis of said spindle.

3. The improvement of claim 2 wherein said lever means includes a first class lever.

4. The improvement of claim 2 wherein said cartridge means encircles said spindle and has an axially disposed slot receiving one end of said lever means.

5. The armature winding machine of claim 2 including proximity switch means mounted to said machine and means operatively connected to said actuator for triggering said proximity switch means.

* * * * *